April 18, 1967 F. TEIGELER ET AL 3,314,606
IRRIGATION SYSTEM
Original Filed April 26, 1961 3 Sheets-Sheet 2

INVENTORS.
FREDERICK TEIGELER
and
ROSS H. RASMUSSEN

April 18, 1967   F. TEIGELER ET AL   3,314,606
IRRIGATION SYSTEM
Original Filed April 26, 1961   3 Sheets-Sheet 3

INVENTORS
FREDERICK TEIGELER
and
ROSS H. RASMUSSEN

United States Patent Office 3,314,606
Patented Apr. 18, 1967

3,314,606
IRRIGATION SYSTEM
Frederick Teigeler, Fremont, Nebr. 68025, and Ross H. Rasmussen, Hooper, Nebr. 68031
Continuation of application Ser. No. 105,649, Apr. 26, 1961. This application Feb. 17, 1964, Ser. No. 346,377
3 Claims. (Cl. 239—1)

This application is a continuation of the applicants' co-pending patent application Serial No. 105,649; filed April 26, 1961 now abandoned.

This invention relates to a means and method for the moving of irrigation piping and sprinkler units for the eliminating of excess labor and loss of time, and particularly for the avoidance of the necessity of carrying heavy and cumbersome piping sections above the head.

Heretofore it has been the practice to move long, heavy and cumbersome sections of rigid irrigation piping about a field by carrying them above the head with the arms outstretched so as to carry them at sufficient height to avoid the knocking down of corn and other tall growing crops. Aside from the excess labor involved in these prior art methods, there is a further disadvantage that during the movement of the piping there are long periods during which no irrigation has taken place.

Therefore it is a further object of this invention to provide a method for moving irrigation piping which eliminates much of the loss of irrigation time.

And more particularly it is an object of this invention to provide a method in which the flexible piping sections are moved lengthwise of the corn rows by dragging them between the corn rows rather than having to lift them over the head for movement of sections transversely across the corn rows as has been common in the movement of rigid piping sections heretofore.

In the methods of the prior art it has been necessary in order to move a sprinkler to a new location to disconnect the entire piping set-up and to make a complete movement of all sprinkler-bearing piping sections. Such movements cannot be of great distance and must be done excessively often because of the limitations of the distance the sprinklers will throw out water.

In the prior art, for example, it has been the practice to operate the irrigation system with two piping settings per day, the start of moving for a first setting begins at six in the morning and continues until nine in the morning at which time it is finished. It is necessary that the laborer be free to go home by six o'clock in the evening and for that reason the next movement must be begun at 3:00 in the afternoon, terminating at 6:00 in the evening. This means that only a six-hour irrigation run can be accomplished per day in such a prior art set-up. When an irrigation run is made at night, as is usual, the land irrigated between the evening and morning settings is irrigated much more than land irrigated between the two day settings.

The night-irrigated land is irrigated all night long and for twelve hours, from six in the evening until six in the morning. This is a waste of water and a waste of labor, while at the same time the short irrigation run during the day hours provides insufficient irrigation time for the land. The shorter period of time during the prior art day run makes an additional disadvantage because of the approximately twenty percent evaporation loss of the water applied during the day because of the hot summer sun.

It is a further object of this invention to provide an irrigation method and means which make possible a round-the-clock irrigation with settings equally spaced apart with regard to time and without the irrigation pump ever needing to be shut down.

In the prior art, 25% of the time during the 24 hour day the irrigation system is completely shut down except when the operator has purchased such an additional amount of expensive piping as to make it possible for some piping to be used while other piping is changed. It is therefore an object of this invention to provide a method and means for moving irrigation piping which makes it possible to provide continuous irrigation with a minimum amount of investment in piping.

A further advantage of the system of this invention is in that the best labor personnel can be obtained because working conditions are so much superior to those in the prior art where back breaking labor was necessary in the movement of long cumbersome sections of pipe carried overhead in the hot summer sun.

Irrigation systems of the prior art have had a length of main piping with one or more lengths of lateral piping disposed at a right angle to the main. The sprinkler risers extend up in the air from the lateral at various points in accordance with the distance the sprinkler heads throw water. This had a disadvantage in that only one sprinkler is used for each distance along the lateral which is approximately the distance of the diameter of the discharge of the sprinkler head. This leads to a great amount of piping in proportion to the number of sprinklers.

It is therefore an object of this invention to provide, in place of the risers on the lateral piping, of the prior art, a connection for making possible discharge from the lateral to sub-lateral lengths of piping on both sides of the lateral whereby two sprinklers are employed in our system in proportion to the same length of lateral piping, in place of one sprinkler heretofore used for the same length of lateral piping. In this way we eliminate much of the lateral piping otherwise needed with its attendant labor of movement as well as the time lost in its movement.

Another object of the invention is to provide an improvement on our own abandoned prior application, Serial No. 490,782 titled "Irrigation System," and more particularly it is an object of this invention to reduce the labor necessary in the operation of our own earlier abandoned application, and is a co-pending application with our own co-pending application Serial No. 534,313, filed September 14, 1955 titled Irrigation System, now abandoned.

More particularly this invention is to provide an improvement over the earlier application making possible irrigation on both sides of a lateral length of piping at the same time, through the employment of sub-laterals extending both to the right and the left of the lateral piping, each sub-lateral carrying a sprinkler.

It is more particularly an object of this invention to provide a system for shifting the sections of the flexible piping on the right hand side of the lateral to the left hand side with the least labor involved and in such a manner as to make efficient and practical the irrigation on both sides of the lateral simultaneously.

A further object of the invention is to provide a system of shifting the flexible sections of the sub-lateral piping of our invention which makes possible a maximum amount of irrigation going on simultaneously with a minimum amount of investment in piping equipment.

We have discovered an inobvious thing in that it is much easier to pull flexible piping sections along the ground than one would expect because in a system of our type in which movement is made immediately following the shutting off of the corresponding valve, the flexible piping is moved while it is still cool from the water in it, whereby the exterior of the pipe is covered with condensation water which lubricates the pulling of the flexible piping section across the ground.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
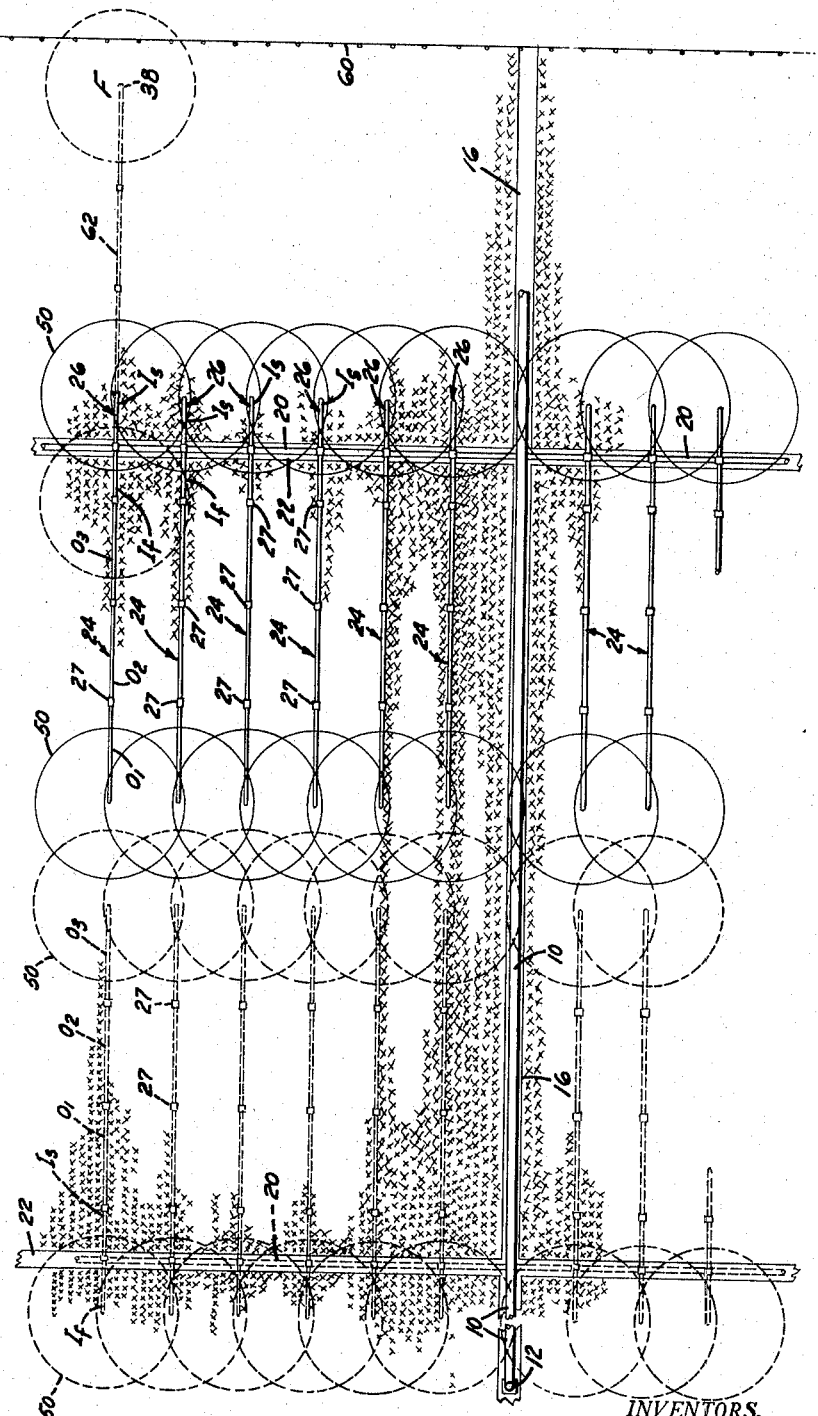
FIGURE 1 is a top plan view of a field being irrigated with a system of this invention with rows of corn plants being diagrammatically illustrated and incompletely shown for convenience of illustration. Certain positions of lateral and sub-lateral piping are shown in full lines, while earlier and later positions are indicated in dotted lines.

In our method of irrigating a main or main length 10 of irrigation piping is extended across the field as shown in FIGURE 1. One end of the piping 10 is adapted to be connected to a source of water supply such as a well 12.

The opposite end of the main length of piping 10 extends whatever distance is desired.

The main 10 extends through a sod strip 16 of a sufficient width so as to permit a tractor to drive down it.

A lateral or lateral length of piping is shown at 20 on one side of the main 10. The lateral 20 extends transversely to the main 10 and is preferably at a right angle thereto. The lateral 30 has its inner end connected to the main 10 for receiving water and the lateral 20 extends out into the field any desired distance.

Another lateral 20 can extend outwardly from the main 10 on an opposite side of the main 10 if desired, and is similarly connected to the main 10.

The laterals 20 extend down sod strips 22 of a sufficient width so as to permit a tractor to travel down the strips 22.

In accordance with this invention many pairs of sub-lateral lengths of flexible irrigation piping 24 and 26 are placed transversely to the lateral 20 and are equi-distantly spaced apart with respect to each other along the lateral 29, a sub-lateral 24 of each pair extends to one side and a sublateral 26 of each pair extends to the other side of the lateral 20 directly opposite the sub-lateral 24 and in alignment therewith transversely of and preferably at a right angle to the lateral 20. Many pairs of sub-laterals 24 and 26 are disposed on the lateral 20 at different equi-distantly spaced apart points along the lateral 20 with all sub-laterals 24 and 26 being disposed in parallelism with each other preferably.

The pairs of sub-laterals 24 and 26 are each composed of a plurality of connected and disconnectable individual sections and the sections are connected by disconnectable couplers or other connecting means generally indicated at 27 and of any suitable construction.

Figure 2:
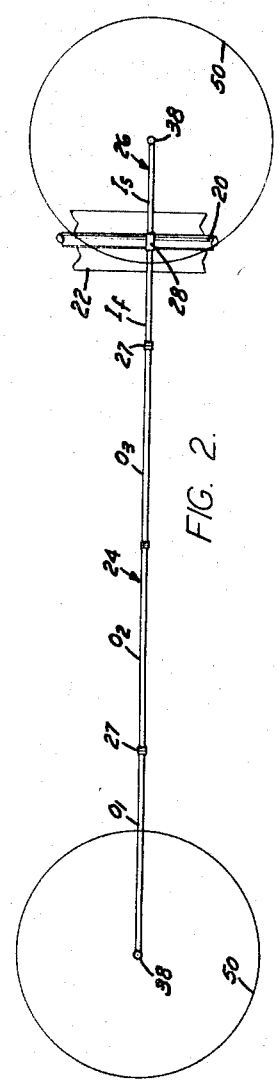
FIGURE 2 is a top plan view simliar to FIGURE 1 but showing a small portion of a lateral pipe connected to a pair of sections of sub-lateral piping for indicating a preferred first time position of the sub-laterals for sprinkling.

It is preferable that all of the sub-laterals 24 be of a similar construction at the first time period of irrigation and all of the sub-laterals 26 be of a similar construction at the first time period of irrigation, and the preferred construction during the first time period of irrigation is best seen in FIGURE 2.

In FIGURES 2 to 5, the same two sub-laterals 24 and 26 of a pair are shown in various alternate positions as will now be more completely described.

Again referring to FIGURE 2, the first sub-lateral 24 is composed of a plurality of connected and disconnectable sections including an outermost section $O_1$, a next outermost section $O_2$, a second outermost section $O_3$, disposed inwardly of the section $O_2$, and an innermost section $I_f$, which stands for innermost section of the first sub-lateral.

On the other side of the lateral 20 from the first sub-lateral 24 is the second sub-lateral 26 of the pair 24 and 26 which preferably has only one section, the latter is given the numeral $I_f$ standing for inner section of second lateral.

The sections $O_1$, $O_2$ and $O_3$ are preferably twice as long as the section $I_f$ and $I_s$. For example the latter can be 30 feet, the former 60 feet. All sections are joined to adjacent sections by disconnectable couplers 27.

Figure 6:
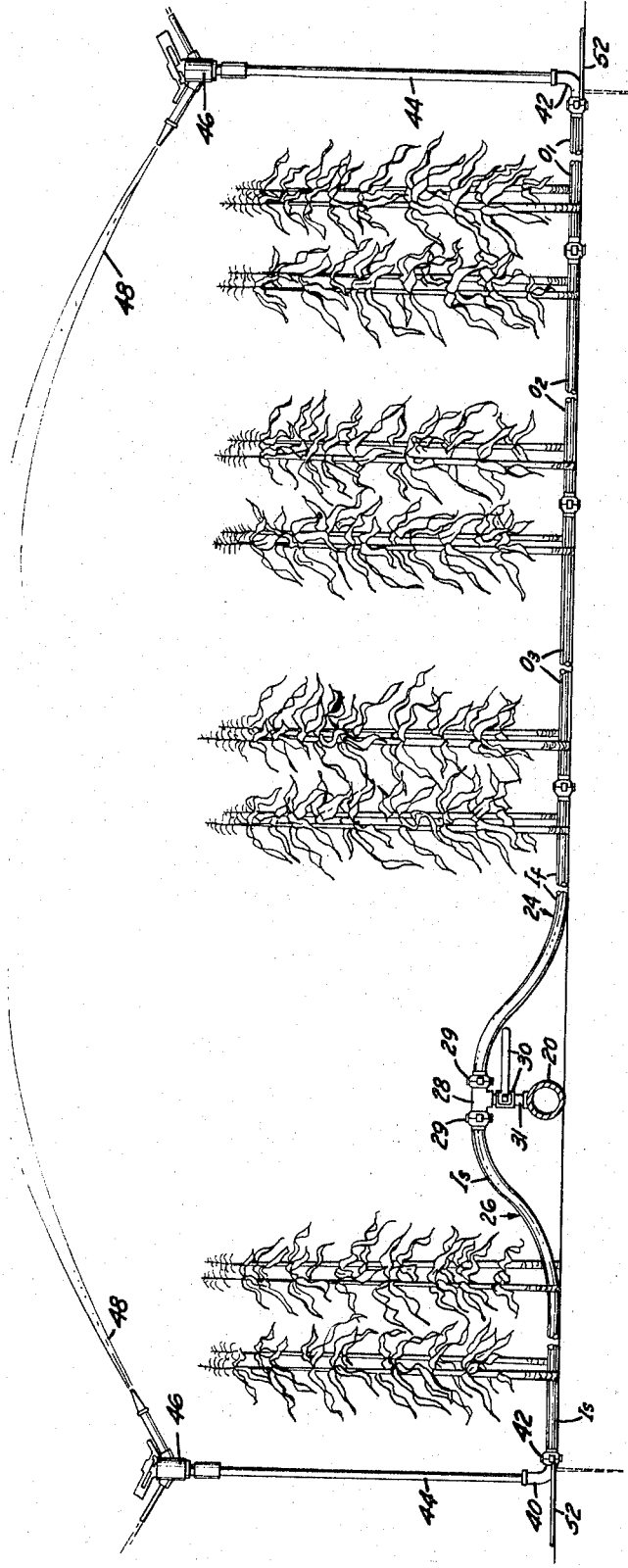
FIGURE 6 is a side elevation of a segment of lateral piping shown with a pair of lengths of sub-lateral piping attached to it and in accordance with this invention with sprinkler risers and sprinklers shown in place, and with corn diagrammatically illustrated.

As best seen in FIGURE 6, the innermost sub-lateral sections $I_f$ and $I_s$ of each pair of sub-laterals 24 and 26 are respectively connected by disconnectable connecting couplers 29 to a T 28 which is disposed above and spaced from the lateral piping 20. A valve 30 is disposed beneath and is connected to the T 28 and a pipe fitting 31 connects the valve 30 with the upper side of the lateral pipe 20 whereby water can flow through the valve 30 and the T 28 into the sub-lateral sections 24 and 26 earlier.

At the time the first and second sub-laterals are in the positions shown in FIGURE 2, sprinkler assemblies diagrammatically illustrated in FIGURES 1 to 5, inclusive, by small circles at 38 are disposed on the outer end of the sub-lateral sections $O_1$ and $I_f$ as shown diagrammatically at 38 as indicated in small circles in FIGURES 2 to 5. The sprinkler assemblies 38 throw water out a considerable distance and for convenience of illustration and by way of example the distance shown by the outer circle 50 in FIGURE 2 can be a sprinkling radius of 45 feet.

After irrigation has taken place for a period of time with the first and second sub-laterals 24 and 26 in the positions shown in FIGURE 2, it becomes desirable to move the sprinkler assemblies 38.

To move the sprinkler assemblies, the first action is to remove the sprinkler assembly 38 from the end of the section $O_1$; secondly, the sprinkler assembly 38 is attached to the outer end of the section $O_2$.

Figure 3:
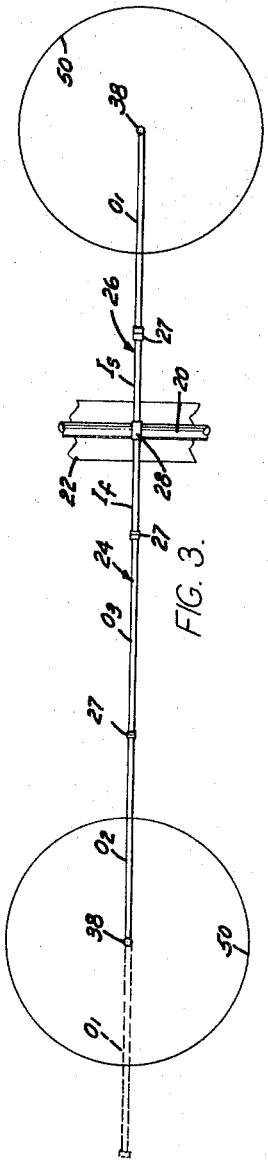
FIGURE 3 is a view of the same parts shown in FIGURE 2, but with a section of one of the sub-laterals moved to a second time position.

Thirdly, the section $O_1$ is moved to the other side of the lateral 20 and into the position shown in full lines $O_1$ in FIGURE 3.

When the section $O_1$ is moved to the second lateral as shown in FIGURE 3, the sprinkler assembly 38 at the end of section $I_s$ is removed. Then the formerly outer end of section $O_1$ is connected to the outer end of the section $I_s$. Then the sprinkler assembly 38 that was formerly on the section $I_s$ is placed on the outer end of section $O_1$. All parts are then in the second time position shown in FIGURE 3 and irrigation continues in this position until a sufficient time period has passed.

Figure 4:
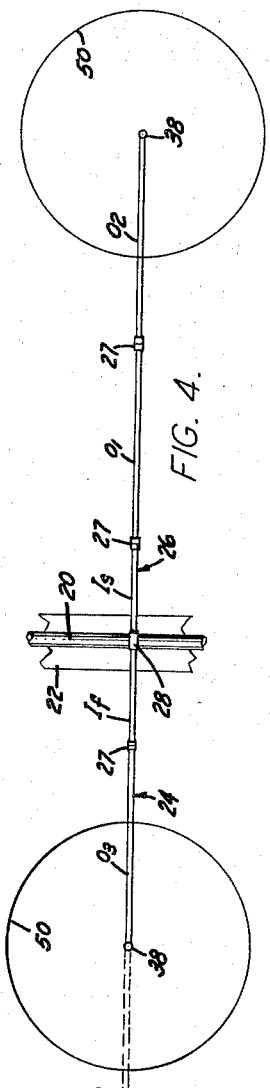
FIGURE 4 is a view similar to FIGURE 3 but of a third time position of the pair of sub-laterals.

Referring to FIGURE 4, it will be seen that when it is desired to change the irrigation position from that shown in FIGURE 3, the sprinkler assembly 38 is disconnected from the outer end of the section $O_2$ and the section $O_2$ is removed from the section $O_3$. The sprinkler assembly 38 is then placed on the outer end of the section $O_3$. Then the section $O_2$ is moved to the other side of the lateral 20 and to be placed on the sub-lateral 26. This latter is accomplished by moving the sprinkler assembly 38 from the outer end of the section $O_1$ and placing the formerly outer end of the section $O_2$ in connection with the outer end of the section O₁. The sprinkler assembly 38 is then placed on the outer end of the section O₂.

Figure 5:
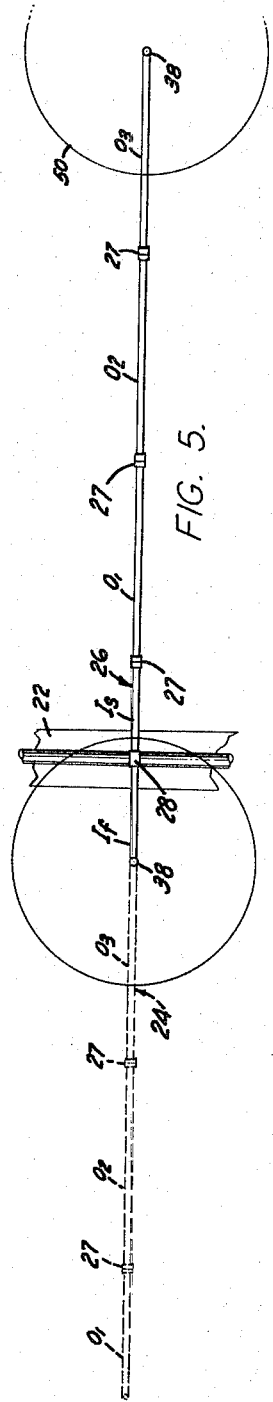
FIGURE 5 is a view similar to FIGURE 4 and showing a fourth time position of the pair of sub-laterals.

After irrigation is continued in the third time position shown in FIGURE 4 for a sufficient time, the sprinkler assembly 38 is removed from the section O₃. The section O₃ is then removed from the section I_f, then the sprinkler assembly 38 is put on the outer end of the section I_f and the section O₃ is moved to the other side. Then the sprinkler assembly 38 is removed from the outer end of the section O₂, and formerly outer end of the section O₃ is connected to the outer end of the section O₂ and the sprinkler assembly 38 is then connected to the outer end of the section O₃, whereby the parts are in a position as shown in FIGURE 5 for irrigating during the fourth time period.

Referring to FIGURE 1, it will be seen that the principles illustrated in FIGURES 2 to 5 can be applied to a system in which a great many sub-laterals 24 and 26 are arranged in pairs.

All sub-laterals 24 are preferably identical and all sub-laterals 26 are preferably identical.

In FIGURE 1, a fence row is indicated at 60 whereby in irrigating the field a good position for a sprinkler assembly 38 is illustrated in dotted lines at F in the upper right hand corner of FIGURE 1 whereby the fence row 60 is overlapped to some extent by the water from the sprinkler assembly 38. The point F of the sprinkler assembly 38 in FIGURE 1, is the first position of the sprinkler assembly 38 nearest the fence row 60. A long sub-lateral composed of four sections is disposed extending from the position F inwardly to the closest lateral 20.

For convenience of description and to avoid confusion with numerals used elsewhere, the section of the sub-lateral extending from the point F inwardly to the lateral 20 shall be indicated only by the numeral 62. It will be understood that a great number of sub-laterals 62 can be put in substantially the position shown in 62, but disposed in parallelism with the position of the sub-lateral 62 and for convenience of illustration.

The other sub-laterals are not shown. It would be understood that their outermost ends of the sub-laterals 62, not shown, would all be as close to the fence row 60 as is the sub-lateral 62 which is shown.

The sprinkler assemblies 38 would next be moved inwardly until they reach the full line positions shown in FIGURE 1 by series of movements similar to those above described in FIGURES 2 to 5, inclusive.

When the sub-laterals 24 and 26 have reached the positions shown in full lines in FIGURE 1, they are in the latest positions prior to the need for shifting the lateral 20 to a new position along the main 10.

Referring to the FIGURE 1, when sufficient irrigation has taken place with the sub-laterals 24 and 26 disposed in the full line positions there shown, it is time to move the lateral 20 to a new position on the main 10 and for this purpose the sub-laterals 24 and 26 are disconnected from the T 28 at the corresponding connections 29 after water to the T 28 is shut off by a closing of the valve 30 disposed between the T 28 and a member 31 connecting the valve 30 and the upper side of the lateral 20.

The sprinkler assemblies 38 are each preferably composed of an elbow 40 connected to the outer end of a respective sub-lateral 24 or 26 by means of a coupler 42 best seen in FIGURE 6. A riser 44 extends upwardly from the elbow 40 a distance of five or seven feet for example when corn is being irrigated and upwardly to a sprinkler head 46 attached to the upper end of the riser 44 and spouting water outwardly, as seen at 48, into a circle 50.

The riser 44 can be held in a stable position by any suitable means such as a member 52 attached to the elbow 40 and spreading out over the surface of the ground for providing the riser 44 with stability.

From the foregoing description, it is thought to be obvious that an irrigation system constructed in accordance with our invention is particularly well adapted for use, by reason of the convenience and facility with which it may be assembled and operated, and it will also be obvious that our invention is susceptible of some change and modification without departing from the principles and spirit thereof, and for this reason I do not wish to be understood as limiting myself to the precise arrangement and formation of the several parts herein shown in carrying out our invention in practice, except as claimed.

We claim:

1. The method of operating an irrigation system having the following apparatus: in an irrigation system, a lateral, a pair of sub-laterals disposed on opposite sides of a same point on said lateral and disposed extending transversely to said lateral, means removably connecting said pair of sub-laterals to said lateral at said point, each of said sub-laterals comprising a plurality of sections, means removably connecting said sections of each sub-lateral together respectively, and sprinkler means removably attached to the outer end of each sub-lateral, the total sprinkling means being such that the major portion of all sprinkling done by the system is done from the outer ends of the sub-laterals, said system having substantially no sprinkling means operating from substantially the position of the lateral itself, the method comprising: taking endmost sub-lateral sections on one side of said lateral and arranged to receive water from said point on said lateral disconnecting them and moving them one by one in successive stages to the other side of said lateral and there connecting them to endmost sections on the said other side of said lateral into an arrangement for receiving water from that same said point on said lateral whereby it is possible to have irrigation efficiently flowing from both of said sprinkling means simultaneously by use of two sprinkling means per each said point on said lateral, and the method in its sprinkling aspects is as follows: the method of irrigating by circular area which comprises sprinkling at a first time interval in a first circular area spaced a given distance from and on one side of a straight reference line and also simultaneously sprinkling in a second circular area at a much greater distance from and on the opposite side of said reference line, then sprinkling in a second successive time interval in a third circular area disposed on said other side of said reference line and disposed at a shorter distance from said reference line than said second circular area and simultaneously sprinkling in a fourth circular area disposed on said one side of said reference line and spaced farther from said reference line than the first circular area, the distance between the second and third areas being equal to the distance between the first and fourth areas, and progressively sprinkling in at least one later successive time interval at two circular areas on said later interval with sprinkling done on said one side of said line being progressively farther from said line and that done on the other side of said line being progressively closer to said line by successive distances equal respectively to the distances said areas on the other side of said line are farther from said line, sprinkling being done at all times during said time intervals on at least one side of said reference line whereby sprinkling during said time intervals is continuously in operation, and whereby during each said time interval the position of the respective circular area on a given side of said reference line is a greater or lesser distance from said reference line than it was during the previous time interval, said reference line being along said lateral, the sprinkling being done substantially in circular areas respectively, which latter are, respectively, the circular areas above mentioned, during such movements said sections being moved endwise of themselves so that they can be moved lengthwise of rows of tall crop in the open spaces between the rows and need not be moved crosswise of themselves and crosswise of rows of tall crop.

2. The method of claim 1 in which no sprinkling whatsoever is done except at said circular areas.

3. In an irrigation system, a lateral, a pair of sub-laterals disposed on opposite sides of a same point on said lateral and disposed extending transversely to said lateral, means removably connecting said pair of sub-laterals to said lateral at said point, each of said sub-laterals comprising a plurality of sections, means removably connecting said sections of each sub-lateral together respectively, and sprinkler means removably attached to the outer end of each sub-lateral, the total sprinkling means being such that the major portion of all sprinkling done by the system is done from the outer ends of the sub-laterals, said system having substantially no sprinkling means operating from substantially the position of the lateral itself, whereby by taking sub-lateral sections on one side of said lateral and arranged to receive water from said point on said lateral and moving them one by one in successive stages to the other side of said lateral into an arrangement for receiving water from that same said point on said lateral it is possible to have irrigation efficiently flowing from both of said sprinkling means simultaneously by use of two sprinkling means per each said point on said lateral, the said sub-lateral sections on each side of said lateral being of a standard length with the exception of at least one section adjacent said lateral being of substantially lesser than standard length, at least the majority of said sections being formed of flexible hose for making it possible to drag such flexible sections across said lateral with the majority of the weight of a flexible section supported by the ground to cooperate with other features of the system for labor saving, whereby a system is provided which is particularly adapted for efficient irrigation when used by moving the sub-lateral sections endwise of themselves and thereby parallel to and between rows of tall crop whereby the sections need not be lifted over rows of tall crop for maximum savings of labor.

References Cited by the Examiner
FOREIGN PATENTS

| | | |
|---|---|---|
| 517,859 | 12/1920 | France. |
| 138,339 | 7/1920 | Great Britain. |
| 138,343 | 10/1920 | Great Britain. |
| 138,344 | 3/1921 | Great Britain. |
| 138,346 | 3/1921 | Great Britain. |

EVERETT W. KIRBY, *Primary Examiner.*